United States Patent [19]

Suzuki et al.

[11] Patent Number: 4,594,112

[45] Date of Patent: Jun. 10, 1986

[54] METHOD FOR PREVENTING FILIFORM CORROSION ON METAL SURFACES

[75] Inventors: Shoichi Suzuki; Moriji Kurobe, both of Nagoya; Toshima Araga, Toyota; Osamu Hiruta, Aichi, all of Japan

[73] Assignee: Kabushiki Kaisha Toyota Chou Kenkyusho, Aichi, Japan

[21] Appl. No.: 763,098

[22] Filed: Aug. 6, 1985

Related U.S. Application Data

[63] Continuation of Ser. No. 557,505, Dec. 2, 1983, abandoned.

[30] Foreign Application Priority Data

Jun. 30, 1981 [JP] Japan ................. 56-102954

[51] Int. Cl.⁴ .............. C23C 22/00; B05D 3/02
[52] U.S. Cl. .................. 148/6.14 R; 427/386; 427/388.1; 427/388.2
[58] Field of Search ............. 427/388.1, 388.2, 386; 148/6.14 R

[56] References Cited

U.S. PATENT DOCUMENTS

| | | | |
|---|---|---|---|
| 3,563,939 | 2/1971 | Stevens, Jr. et al. | 260/37 |
| 3,567,676 | 3/1971 | Herrigel et al. | 148/6.27 |
| 3,671,295 | 6/1972 | Ravve et al. | 427/44 |
| 3,877,977 | 4/1975 | Watanabe et al. | 148/6.14 R |
| 4,098,762 | 7/1978 | Miyata et al. | 106/306 X |
| 4,147,690 | 4/1979 | Rich | 260/45.7 R |
| 4,190,468 | 2/1980 | Kitayama et al. | 148/6.14 R |

Primary Examiner—Thurman K. Page
Attorney, Agent, or Firm—Blum Kaplan Friedman Silberman & Beran

[57] ABSTRACT

A coating composition comprises a film forming component including resin and 0.05 to 20% by weight, based on 100% by weight of the film forming component, of at least one hydroxide selected from among calcium hydroxide, aluminum hydroxide, magnesium hydroxide and zinc hydroxide. The coating composition gives excellent resistance to filiform corrosion to an article under high humidity and under a long term exposure.

13 Claims, 2 Drawing Figures

METHOD FOR PREVENTING FILIFORM CORROSION ON METAL SURFACES

This is a continuation of application Ser. No. 557,505 filed Dec. 2, 1983, now abandoned.

BACKGROUND OF THE INVENTION

1. Field of the Invention

This invention relates to a coating composition capable of inhibiting the filiform corrosion which frequently occurs on coated articles of iron, aluminium and magnesium when the articles are used under relative humidity of about 60 to 95%.

2. Description of the Prior Art

The filiform corrosion is one of the typical of corrosion occuring in coated or otherwise decorated containers, furniture, electrical appliances, and automobiles. Efforts are continued to preclude this corrosion. A method which comprises subjecting the surface of a steel plate to a so-called chemical treatment for forming thereon crystals of iron phosphate or zinc phosphate and subsequently applying a coat thereto, and a method which comprises plating the surface of a steel plate with a metal such as zinc, nickel, or chromium which is incapable of causing filiform corrosion and subsequently applying a coat thereto are now in actual use. The former method, however, fails to provide thorough prohibition of filiform corrosion for products intended for use under high humidity, although it provides effective prohibition of filiform corrosion for products intended for use under mild conditions such as in dry room interiors. The latter method provides effective prevention of filiform corrosion only when the plating is effected to an ample thickness. This method, however, poses a problem from the standpoint of saving of resources and production cost and, therefore, has not come to find popular acceptance as an undercoat.

SUMMARY OF THE INVENTION

In view of the fact described above, the inventors conceived the idea that if incorporation of an inexpensive additive prevented a paint from filiform corrosion, it would constitute a highly effective measure for saving resources and improving the commercial value of a coated article at low cost. The inventors studied various additives and found that specific metal hydroxides were effective additives. The present invention has been perfected based on this finding.

Accordingly, one object of the present invention is to provide a coating composition which sufficiently prevents filiform corrosion of an article to be used under high humidity.

Another object of the present invention is to provide a coating composition giving excellent resistance to filiform corrosion with ease and at a low cost while saving resources.

A further object of the present invention is to provide a coating composition suitable for an undercoat of a metallic article.

The coating composition of this invention is characterized by comprising a film forming component including resin and 0.05 to 20% by weight, based on 100% by weight of the film forming component, of at least one hydroxide selected from among calcium hydroxide, aluminium hydroxide, magnesium hydroxide and zinc hydroxide.

DETAILED DESCRIPTION

Figure 1:
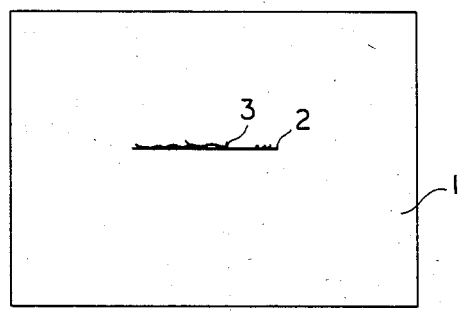
FIG. 1 is a plan view illustrating the result of the test for filiform corrosion performed on a coated plate using a coating composition of the present invention.

The hydroxide contained in the coating composition of the present invention is believed to react with the acid existing at the front end of filiform corrosion which is held to constitute one direct cause for the filiform corrosion, keeps the acidity of the front end of the filiform corrosion continuously neutralized, thereby to impede the progress of the filiform corrosion. It may be possible that besides the hydroxides mentioned above, other hydroxides and carbonates such as calcium carbonate will react with the acid of interest. By the inventors' study, however, no other substance than the aforementioned hydroxides has been found to be effective against filiform corrosion.

The blending ratio of the hydroxide is 0.05 to 20% by weight based on 100% by weight of the film forming component of the coating composition. When this ratio is less than 0.05% by weight, the effect of the hydroxide in the prevention of filiform corrosion is insufficient. When the ratio exceeds 20% by weight, no additional effect will be expected. The preferred range of the blending ratio is 0.5 to 10% by weight, based on 100% by weight of the film forming component.

The particle size of the hydroxide is desired to be uniformly distributed and, for the purpose of obtaining smoothness of the surface of the coated article, the particle diameter is preferably in the range of 0.1 to 2 μm.

The hydroxide, depending on its particular kind, may possibly react with the film forming component and bring about some adverse effects upon the coating film to be produced. When an epoxy resin is used as the resinous component, for example, aluminium hydroxide suits the additive. Calcium hydroxide, etc. are liable to turn the coat whitish.

As the film forming component for the coating composition of this invention, the conventional film forming component can be used. For example, a coating resin, pigment, dye, filler and other various additives can be used to constitute a film forming component. Examples of the coating resin include aminoalkyd resin, baking acrylic resin, cold curing acrylic resin, cold curing vinyl chloride resin, boiled oil, phenolic resin, and oil-modified butadiene resin. The coating may be applied in a powdered form, an oily form, a water-soluble form, or an electrodeposited form. The coating composition of the present invention manifests its effect only when it is directly applied to the surface of a metallic article. When the metallic article requires application of multiplicity of coating films such as an undercoat, an intermediate coat, and a top coat, therefore, the coating composition of this invention must be used as the undercoat.

The metallic articles on which the coating composition of the present invention is used are those of iron, aluminium, magnesium or an alloy thereof which are susceptible of formation of filiform corrosion. Among these metallic articles, those of iron and steel are practically important. The coating composition of this invention is applied to the surfaces of such metallic articles which have been cleaned by a treatment usually adopted. The effect of the coating composition of this invention in the prevention of filiform corrosion becomes more conspicuous when the coating composition is applied to a metallic article whose surface has been subjected to a so-called chemical treatment which has been heretofore adopted as a pretreatment for coating, namely, a treatment for forming crystals of iron phosphate or zinc phosphate on the surface.

The invention will now be described with reference to several examples thereof. The filiform corrosion indicated in these examples has been tested by the following method.

The filiform corrosion is sometimes observed on coated articles which are used outdoors. Typical form of this phenomenon, however, is observed when the coated articles are used indoors. The resistance of such coated articles to the filiform corrosion, therefore, is rated most practically by exposing the coated articles indoors. Since this method takes much time before it yields the desired result, ASTM D-2803 specifics the method for this purpose. The method comprises spraying given samples with salt water (Salt Spray Testing of JIS Z 2371) for 4 to 24 hours and subsequently exposing them to the environmental conditions of a temperature of 25° C. and relative humidity of 85%. The method of rating the filiform corrosion to be used in the present invention is based on this ASTM method. To be specific, it comprises incising a scratch in the coating film of the coated sample to a depth reaching the underlying metallic substrate, bringing the scratch into intermittent contact with 5% sodium chloride solution, subsequently exposing the sample to the environmental conditions of a temperature of 35° C. and relative humidity of 75%, measuring filiform corrosion of the largest length formed from the scratch, and rating the degree of filiform corrosion based on the length.

EXAMPLE 1

Calcium hydroxide having a mean particle diameter of about 1 $\mu$m was uniformly dispersed by means of ultrasonic waves in a coating thinner (20 times as much as calcium hydroxide by weight) formed mainly of xylene. The dispersion thus produced was added to a commercially available baking type acrylic paint (produced by Mitsui Toatsu Chemicals Inc. and marketed under the trade name of ALMATEX) in such a proportion that calcium hydroxide added thereto accounts for 3% by weight based on the film forming component. The coating composition thus obtained was adjusted with thinner to a viscosity required for spraying. A steel plate of 0.8 mm in thickness which had been subjected to a chemical treatment with zinc phosphate in advance (the amount of deposition of zinc phosphate 1.5 g/m$^2$) was coated with this paint by spraying to a dry film thickness of about 30 $\mu$m. The coated plate was baked at 140° C. for 20 minutes. The resultant coated plate was subjected to the aforementioned test for filiform corrosion. For the purpose of comparison, a paint containing no calcium hydroxide was prepared and similarly applied to a steel plate, which was baked and subjected to the test for filiform corrosion. When the filiform corrosion developed to 3 mm on the coated plate using the paint containing no calcium hydroxide, the filiform corrosion in the coated plate using the paint containing 3% by weight of calcium hydroxide was less than 1 mm.

When the coated plates were subjected to the salt spray testing, it was established that the resistance to salt spray was not degraded by the addition of calcium hydroxide.

EXAMPLE 2

The paint prepared in the same manner as in EXAMPLE 1 was applied by spraying to a dry film thickness of about 30 $\mu$m on a steel plate of 0.8 mm in thickness which had not undergone the chemical treatment. The coated plate thus formed was baked at 140° C. for 20 minutes. The resultant coated plate was subjected to the aforementioned test for filiform corrosion. A coated plate using the paint containing no calcium hydroxide was similarly prepared and subjected to the test for filiform corrosion.

When the filiform corrosion developed to 7.7 mm on the coated plate using the paint containing no calcium hydroxide, the filiform corrosion in the coated plate using the coating composition of this example was only 4.4 mm.

EXAMPLE 3

The procedure of EXAMPLE 2 was repeated, except that aluminium hydroxide having a mean particle diameter of 1 $\mu$m was used in the place of calcium hydroxide. Similarly a coated plate was prepared. When the filiform corrosion developed to 7.7 mm in the coated plate using no hydroxide, the filiform corrosion in the coated plate using the coating composition containing aluminium hydroxide was only 4.6 mm.

EXAMPLE 4

A dispersion of calcium hydroxide in a coating thinner obtained as described in EXAMPLE 1 was added to a commercially available aminoalkyd paint (a paint produced by Kansai Paint Co., Ltd., formulated for application as an intermediate coat on automobiles and containing about 40% of titanium oxide based on the film forming component, i.e., a mixture of amino resin and alkyd resin) in a proportion such that calcium hydroxide added accounts for 1.2% by weight based on the film forming component. The coating composition thus obtained was adjusted with thinner to a viscosity required for spraying. The paint was applied by spraying to a dry film thickness of 10 $\mu$m on a steel plate which had been subjected to the chemical treatment as described in EXAMPLE 1. The coated plate was baked at 140° C. for 30 minutes. On the baked coat thus obtained, a white aminoalkyd enamel formulated for use as a top coat on automobiles was applied by spraying to a dry film thickness of 30 $\mu$m and baked at 140° C. for 30 minutes. The resultant coated plate was subjected to the aforementioned test for filiform corrosion. After 2000 hours of exposure under relative humidity of 85%, the filiform corrosion was less than 1 mm. The condition of filiform corrosion at the end of the exposure is illustrated in FIG. 1. In the diagram, the line which runs along the center of the coated plate 1 is a scratch 2 incised in advance for the purpose of the test. The filiform corrosion 3 is the corrosion formed in the form of a wale perpendicularly to the scratch 2.

Figure 2:
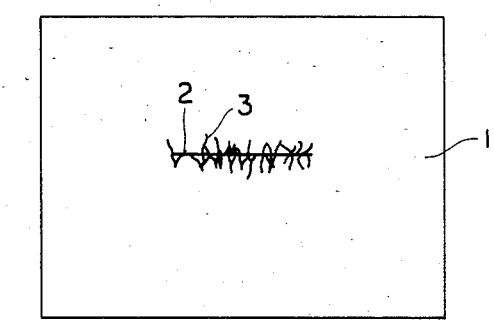
FIG. 2 is a plan view illustrating the result of the test for filiform corrosion performed on a coated plate using a conventional coating composition for referential purpose.

For comparison purpose, a coated plate was prepared by following the procedure above, except that addition of calcium hydroxide was omitted. This coated plate was subjected to the test for filiform corrosion. After 2000 hours of exposure under relative humidity of 85%, the filiform corrosion developed to 4 mm. The condition of the filiform corrosion after 2000 hours of exposure is illustrated in FIG. 2. In the diagram, the line which runs along the center of the coated plate 1 is a scratch 2 incised for the purpose of the test. Numerous filiform corrosions 3 were found in the diagram.

The two coated plates described above, with scratches incised therein, were acted upon by 5% sodium chloride solution and then left indoors in winter for five months. In this case, the coated plate using the coating composition of the present example containing calcium hydroxide was not found to develop any filiform corrosion. Occurrence of filiform corrosions of about 5 mm was observed in the coated plate containing no calcium hydroxide.

EXAMPLE 5

A dispersion of calcium hydroxide in a coating thinner obtained as described in EXAMPLE 1 was added to the same commercially available aminoalkyd paint as described in EXAMPLE 4 in a proportion such that calcium hydroxide added accounts for 0.6% by weight based on the film forming component. The coating composition thus obtained was adjusted with thinner to a viscosity required for spraying. It was applied to a steel plate subjected to the chemical treatment, which was then baked by following the procedure described in EXAMPLE 1 to produce a coated plate. The resultant coated plate was subjected to the test for filiform corrosion. A coated plate using the paint containing no calcium hydroxide was similarly prepared and subjected to the test for filiform corrosion.

When the filiform corrosion developed to 3 mm on the coated plate using the paint containing no calcium hydroxide, the filiform corrosion in the coated plate using the coating composition containing calcium hydroxide was only 1.5 mm.

EXAMPLE 6

A paint prepared as described in EXAMPLE 4 was applied by the procedure of EXAMPLE 2 to a magnesium plate of 2 mm in thickness. When the coated plate was subjected to the aforementioned test for filiform corrosion, the filiform corrosion was less than 1 mm even when, under the same conditions, the filiform corrosion developed to 3 mm in the coated plate using the paint containing no calcium hydroxide.

EXAMPLE 7

By following the procedure of EXAMPLE 4, three coating compositions containing aluminium hydroxide having a mean particle diameter of 1 μm, magnesium hydroxide having a mean diameter of 2 μm, and zinc hydroxide having a mean particle diameter of 2 μm, instead of calcium hydroxide, were prepared. They were applied to steel plates similarly, subjected to the chemical treatment and then baked, to produce coated plates. For comparison purpose, a coated plate applied with the paint containing no hydroxide was similarly prepared. The four coated plates were subjected to the test for filiform corrosion. When the filiform corrosion developed to 3.7 mm in the coated plate using the coating composition containing no hydroxide, the filiform corrosion was only 2.2 mm in the coated plate containing aluminium hydroxide, 1.9 mm in the coated plate containing magnesium hydroxide, 1.8 mm in the coated plate containing zinc hydroxide, respectively.

EXAMPLE 8

The coating composition containing magnesium hydroxide having a mean particle diameter of 1 μm was prepared instead of calcium hydroxide of EXAMPLE 4 in such a proportion that magnesium hydroxide added thereto accounts for 10% by weight based on the film forming component. It was applied to a steel plate subjected to the chemical treatment, which was then baked to produce a coated plate. The coated plate was subjected to the test for filiform corrosion. When the filiform corrosion developed to 3.7 mm in the coated plate applied with the paint containing no hydroxide, the filiform corrosion was only 1.3 mm in the coated plate applied with the paint containing magnesium hydroxide.

EXAMPLE 9

A methylethyl ketone solution having a solids content of 10% by weight was prepared by adding 3 parts by weight of a hardener (DDM, i.e. Diamino Diphenyl Methane) and 10 parts by weight of an epoxy resin (EPIKOTE 828, produced by Shell Chemical Corp.) to methylethyl ketone. To the resultant solution, aluminium hydroxide having a mean particle diameter of 1 μm was added in a proportion such that aluminium hydroxide added accounts for 3% by weight based on the solids content of the solution. The mixture was treated by ultrasonic waves to produce a uniformly dispersed coating composition. This paint was applied by dipping to a steel plate which had undergone the chemical treatment. The coated plate was then baked at 180° C. for 20 minutes. The coating film thus formed had a thickness of about 20 μm. A paint containing no aluminium hydroxide was similarly prepared, applied by dipping to the same steel plate which had undergone the same chemical treatment. The coated plate was baked under the same conditions as described above. The two coated plates thus prepared were subjected to the test for filiform corrosion. When the filiform corrosion developed to 2.4 mm in the coated plate using the coating composition containing no aluminium hydroxide, the filiform corrosion in the coated plate using the coating composition containing aluminium hydroxide was only 1.3 mm.

What is claimed is:

1. A method for preventing filiform corrosion on a surface of a substrate under relative humidity of about 60 to 95% consisting of preparing a coating composition including a film forming component including resin selected from the group consisting of aminoalkyd resin, baking acrylic resin, cold curing acrylic resin, vinyl chloride resin, boiled oil, phenolic resin and oil-modified butadiene resin and 0.05 to 20% by weight, based on 100% by weight of said film forming component of a filiform corrosion preventing material of at least one hydroxide selected from the group consisting of calcium hydroxide, aluminum hydroxide, magnesium hydroxide and zinc hydroxide, applying said coating composition directly to said metal surface and baking or cold curing the coated substrate to form a cured coating so that said hydroxide is available to react with an acid formed by filiform corrosion on said metal surface under high humidity conditions, whereby the hydroxide is available to neutralize the acid at the surface to impede the progress of the filiform corrosion.

2. The method of claim 1, wherein the metallic surface is a substrate of one of iron, aluminum and magnesium and alloys thereof.

3. The method of claim 1, wherein said hydroxide is included in the amount of 0.5 to 10% by weight.

4. The method of claim 1, wherein the mean particle diameter of said hydroxide is in the range of 0.1 to 2 μm.

5. The method of claim 4, wherein said resin is epoxy resin and said hydroxide is aluminum hydroxide.

6. The method of claim 4, wherein said resin is acrylic resin and said hydroxide is one of calcium hydroxide and aluminum hydroxide.

7. The method of claim 1, wherein the resins are cured by heating at temperatures between about 140° C. and 180° C.

8. The process of claim 7, wherein the curing is carried out for about 20 to 30 minutes.

9. A method for preventing filiform corrosin on a surface of a substrate selected from the group consisting of iron, aluminum, magnesium, and alloys thereof under relative humidity of about 60-95%, comprising preparing a coating composition including a film forming component including epoxy resin and 0.5 to 10% by weight, based on 100% by weight of said film forming component, of at least one hydroxide as a filiform corrosion preventing component, said hydroxide having a mean particle diameter in the range of 0.1 to 2 μm and applying said coating composition directly to said metal surface.

10. The method of claim 9, wherein said coating composition is applied directly to said metal surface by spraying.

11. The method of claim 9, wherein said coating composition is applied directly to said metal surface by dipping said metal into said coating composition.

12. The method of claim 9, wherein said hydroxide is aluminum hydroxide.

13. A method for preventing filiform corrosion on a surface of a substrate selected from the group consisting of iron, aluminum, magnesium, and alloys thereof under relative humidity of about 60-95%, comprising preparing a coating composition including a film forming component including epoxy resin and 0.5 to 10% by weight based on 100% by weight of said film forming component of aluminum hydroxide as a filiform corrosion preventing component, said aluminum hydroxide having a mean particle diameter in the range of 0.1 to 2 μm, and applying said coating composition directly to said metal surface.

* * * * *

UNITED STATES PATENT AND TRADEMARK OFFICE
CERTIFICATE OF CORRECTION

PATENT NO. : 4,594,112
DATED : June 10, 1986
INVENTOR(S) : Shoici Suzuki et al.

It is certified that error appears in the above-identified patent and that said Letters Patent is hereby corrected as shown below:

Change "[75] Inventors: Shoichi Suzuki; Moriji Kurobe, both of Nagoya; Toshima Araga, Toyota; Osamu Hiruta, Aichi, all of Japan"

To -- [75] Inventors: Shoichi Suzuki; Moriji Kurobe, both of Nagoya;Toshimi Araga, Toyota; Osamu Hiruta, Aichi, all of Japan --.

Also Change "[73] Assignee: Kabushiki Kaisha Toyota Chou Kenkyusho, Aichi, Japan"

To -- [73] Assignee: Kabushiki Kaisha Toyota Chuo Kenkyusho, Aichi, Japan --.

Signed and Sealed this

Twenty-third Day of December, 1986

Attest:

DONALD J. QUIGG

Attesting Officer     Commissioner of Patents and Trademarks